US012699060B2

(12) United States Patent
Chang et al.

(10) Patent No.: US 12,699,060 B2
(45) Date of Patent: Aug. 4, 2026

(54) SEM-EDS HOLDER DEVICE FOR THIN FILTER-TYPE SAMPLE

(71) Applicant: KOREA INSTITUTE OF SCIENCE AND TECHNOLOGY, Seoul (KR)

(72) Inventors: Hye Jung Chang, Seoul (KR); Dae-Young Kim, Seoul (KR); Ha Neul Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 175 days.

(21) Appl. No.: 18/625,034

(22) Filed: Apr. 2, 2024

(65) Prior Publication Data

US 2024/0328968 A1     Oct. 3, 2024

(30) Foreign Application Priority Data

Apr. 3, 2023    (KR) ........................ 10-2023-0043443

(51) Int. Cl.
*G01N 23/20025*      (2018.01)
*G01N 23/223*      (2006.01)
*G01N 23/2251*      (2018.01)

(52) U.S. Cl.
CPC ..... *G01N 23/20025* (2013.01); *G01N 23/223* (2013.01); *G01N 23/2251* (2013.01)

(58) Field of Classification Search
CPC ........... G01N 23/20025; G01N 23/223; G01N 23/2251
See application file for complete search history.

(56) References Cited

U.S. PATENT DOCUMENTS

| | | | |
|---|---|---|---|
| 2017/0169989 A1 | 6/2017 | Leyte Guerrero et al. | |
| 2021/0389579 A1* | 12/2021 | Eichmann | H01J 37/20 |

FOREIGN PATENT DOCUMENTS

| | | | | |
|---|---|---|---|---|
| CN | 202495417 U | * | 10/2012 | ............. H01J 37/20 |
| JP | 2008-258076 A | | 10/2008 | |
| JP | 2016-57222 A | | 4/2016 | |
| JP | 2021144855 A | * | 9/2021 | ............. H01J 37/20 |
| KR | 960011956 U | * | 9/1994 | ............. G01N 23/22 |
| KR | 96-11956 U | | 4/1996 | |
| KR | 20020072983 A | * | 9/2002 | ............. G01N 23/20 |
| KR | 10-2007-0069887 A | | 7/2007 | |
| KR | 10-1009899 B1 | | 1/2011 | |
| KR | 10-2016-0015609 A | | 2/2016 | |

* cited by examiner

*Primary Examiner* — Uzma Alam
*Assistant Examiner* — Fani Polyzos Boosalis

(57) ABSTRACT

The present disclosure relates to an SEM-EDS analysis holder device configured to fix a sample in an SEM-EDX analysis apparatus. More specifically, the present disclosure relates to an SEM-EDS analysis holder device capable of minimizing damage to a sample and reusing the sample. An object of the present disclosure is to provide an SEM-EDS analysis holder device capable of minimizing damage to a sample and reusing the sample in an SEM-EDX analysis apparatus configured by attaching an energy dispersive X-rays spectroscope (EDS) detector to scanning electron microscopy (SEM). Another object of the present disclosure is to provide an SEM-EDS analysis holder device that is easily attached or detached and includes chemical components detected by an EDS detector without a component of a holder.

11 Claims, 7 Drawing Sheets

100

100

100

100

100

X-ray

100

50

SEM-EDS HOLDER DEVICE FOR THIN FILTER-TYPE SAMPLE

CROSS-REFERENCE TO RELATED APPLICATION

This application claims priority to and the benefit of Korean Patent Application No. 10-2023-0043443 filed in the Korean Intellectual Property Office on Apr. 3, 2023, the entire contents of which are incorporated herein by reference.

BACKGROUND OF THE INVENTION

(a) Field of the Invention

The present disclosure relates to a scanning electron microscope (SEM)-energy dispersive X-ray spectroscope (EDS) holder device of an SEM-EDX analysis apparatus, which is capable of fixing a thin filter sample, which is provided in the form of a thin-film, so that the thin filter sample may be realized and/or reused. More specifically, the present disclosure relates to an SEM-EDS holder device for a thin filter-type sample, which is capable of minimizing damage to a sample at the time of mounting and detaching the sample to allow the sample to be reanalyzed and minimizing an error in quantitatively analyzing and detecting chemical components of the sample.

(b) Description of the Related Art

An electron microscope refers to a microscope that uses electron beams and an electromagnetic lens instead of a light source and a light source lens, and the electron beams and the electromagnetic lens perform similar functions to the light source and the light source lens. The electron microscope typically has magnifications of one hundred thousand to several hundred thousand times or more, provides much better resolution, and is used to view a micro-structure of a material. There are two main types of electron microscopes including a transmission electron microscope (TEM) and a scanning electron microscope (SEM). The transmission electron microscope provides a shape (morphology) of a sample by using electron beams passing through a thin specimen. In contrast, the scanning electron microscope refers to a device that may observe a surface of a target sample in a three-dimensional manner by providing a shape of the sample by using secondary electrons (SE) or backscattered electrons (BSE) that are scattered electrons generated when focused electron beams scan the surface of the sample.

In addition, the scanning electron microscope (SEM) is advantageous in that the scanning electron microscope (SEM) may obtain information on the surface of the sample by observing the sample through an image, and the scanning electron microscope (SEM) is not greatly restricted by a thickness, size, and shape of the sample.

Meanwhile, an energy dispersive X-ray spectroscope (EDS) refers to a kind of spectrometer that detects characteristic X-rays, which are emitted by an interaction between electron beams and the sample, and uses the characteristic X-rays to analyze components of the sample. Because the characteristic X-rays have inherent energy values for each element, the constituent elements of the sample may be inferred and identified by comparing the energy values with characteristic values of the known materials. That is, the characteristic X-rays are used for a quantitative analysis such as an analysis of components of the sample. In general, the energy dispersive X-ray spectroscope is attached to a scanning electron microscope and configured to detect compositions of elements that constitute the sample.

The SEM of the SEM-EDS system records shapes of the sample while focusing electron beams on the sample. The EDS qualitatively and quantitatively analyzes chemical components of the sample by detecting characteristic X-rays emitted by an interaction between the electron beams and the elements that constitute the sample.

In addition, as a non-destructive analysis method, the SEM-EDS system generally uses a method of attaching and fixing the sample to an SEM holder by using a carbon tape or silver paste.

Meanwhile, in the related art, a thin-film type filter sample is damaged during a process of handling the sample at the time of attaching the sample to the SEM holder by using the method in the related art, which makes it difficult to reanalyze the sample. Further, in case that a specimen is attached by using a general carbon tape or silver paste in the related art, the specimen cannot be reused at the same time when the specimen is attached. In addition, the component (generally, aluminum) of the SEM holder disposed below the thin filter is simultaneously detected during the EDS analysis, which may degrade the reliability of the chemical analysis.

The above-mentioned background art is technical information that the inventors have retained to derive the present disclosure or have obtained in the course of deriving the present disclosure, and cannot be thus said to be technical information publicly known to the public before filing the present application.

SUMMARY OF THE INVENTION

The present disclosure attempts to provide an SEM-EDS holder device for a thin filter-type sample, which is capable of minimizing damage to a thin filter-type sample at the time of fixing and detaching the thin filter-type sample so as to reanalyze the thin filter-type sample in an SEM-EDX analysis apparatus configured by attaching an energy dispersive X-ray spectroscope (EDS) detector to a scanning electron microscope (SEM).

The present disclosure also attempts to provide an SEM-EDS holder device for a thin filter-type sample, which is capable of detecting only natural chemical components of an analysis target material disposed above a filter without detecting a component of a holder at the time of detecting chemical components by using an EDS detector.

Technical problems to be solved by the embodiments are not limited to the aforementioned technical problem, and other technical problems, which are not mentioned above, may be clearly understood by those skilled in the art from the following descriptions.

An embodiment provides an SEM-EDS holder device for a thin filter-type sample, the SEM-EDS holder device including: a cylindrical holder main body part; a disc part provided at one side of the holder main body part and configured such that a sample is seated on the disc part; and a sample holder part having one side fixedly supported by being coupled to the holder main body part, and the other side configured to fix the sample seated on the disc.

According to the embodiment, the holder main body part may include: a body having a seating groove in which the disc part is seated; and a central shaft formed on a lower portion of the body, and the body may have two stepped portions and have a plurality of fastening holes formed in a diameter direction based on a center point thereof.

3

4

According to the embodiment, the disc part may have a circular plate shape and a diameter smaller than a diameter of an upper portion of the holder main body part and form a stepped portion together with the holder main body part.

According to the embodiment, the sample holder part may have a "¬" shape and include a coupling portion coupled to the holder main body part, and a fixing portion positioned at an upper side of the coupling portion and fixed while being in contact with the sample. In this case, the sample holder part may be made of a non-magnetic element having electrical conductivity, particularly beryllium or a beryllium copper alloy.

Therefore, according to the SEM-EDS holder device for a thin filter-type sample, a material of the disc part, on which the sample is seated, may be selectively replaced in accordance with a material of the sample intended to be analyzed. In addition, because elements below Be (beryllium) are difficult to detect in the EDS detection, the disc part, which does not affect the EDS chemical analysis result, may cover the sample holder part, such that the electron beams of the SEM-EDS device do not interfere with the sample holder part.

According to the embodiments, in the SEM-EDS analysis apparatus configured by attaching the EDS detector to the SEM, the SEM-EDS holder device for a thin filter-type sample may use the selected physical (mechanical) fixing method instead of an attachment/fixing method using a carbon tape or a silver paste, thereby minimizing damage to the thin filter-type sample and allowing the thin filter-type sample to be reanalyzed.

In addition, the SEM-EDS holder device for a thin filter-type sample may be easily attached to or detached from the SEM-EDS analysis apparatus, and the component of the holder may not be detected by the EDS detector, thereby minimizing an error in detecting chemical components to be detected from the sample.

The effects of the SEM-EDS holder device for a thin filter-type sample according to the embodiment are not limited to the aforementioned effects, and other effects, which are not mentioned above, may be clearly understood by those skilled in the art from the following descriptions.

DETAILED DESCRIPTION OF THE EMBODIMENTS

Figure 1:
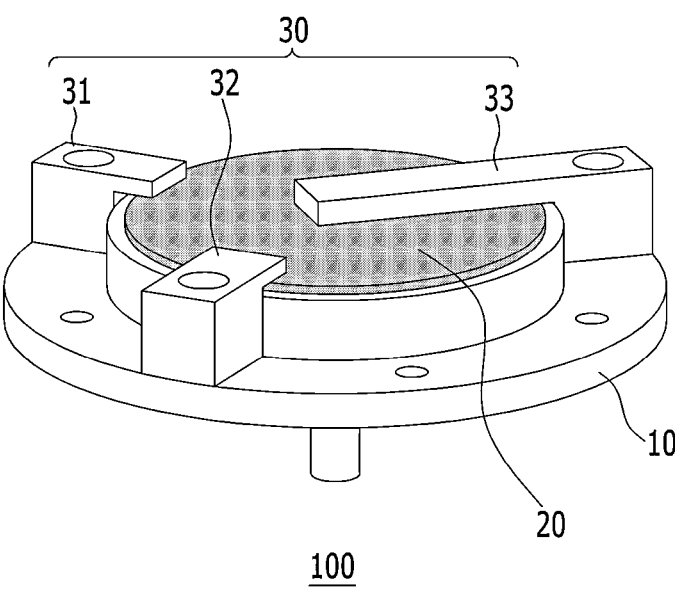
FIG. 1 is a perspective view illustrating an SEM-EDS holder device for a thin filter-type sample according to a first embodiment of the present disclosure.
Figure 2:
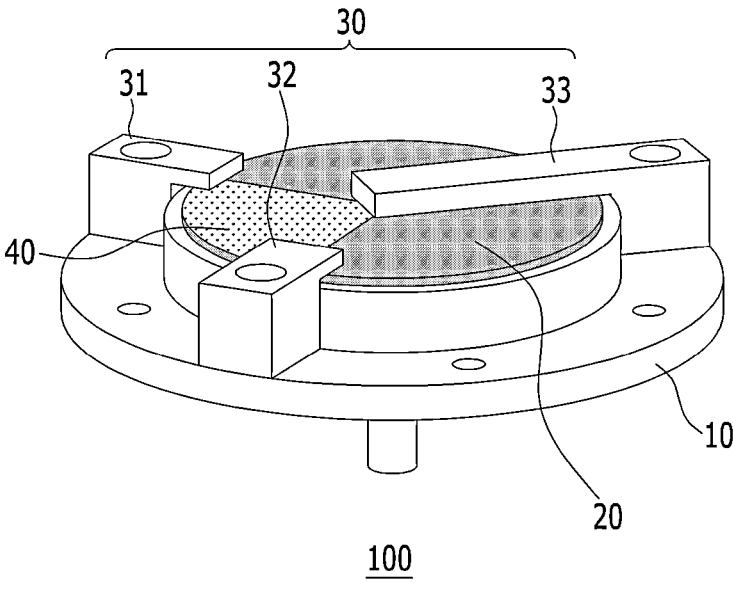
FIG. 2 is a perspective view illustrating a state in which a sample is mounted on the SEM-EDS holder device for a thin filter-type sample according to the first embodiment of the present disclosure.
Figure 3:
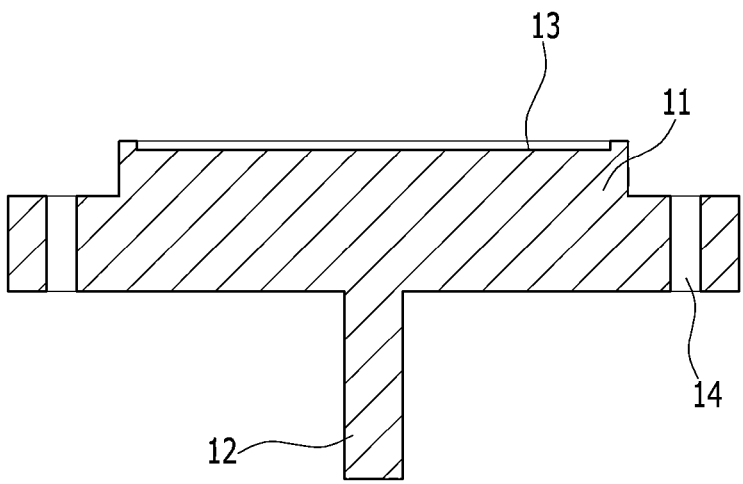
FIG. 3 is a cross-sectional view illustrating a cross-section of a holder main body part of the SEM-EDS holder device for a thin filter-type sample according to the first embodiment of the present disclosure.
Figure 4:
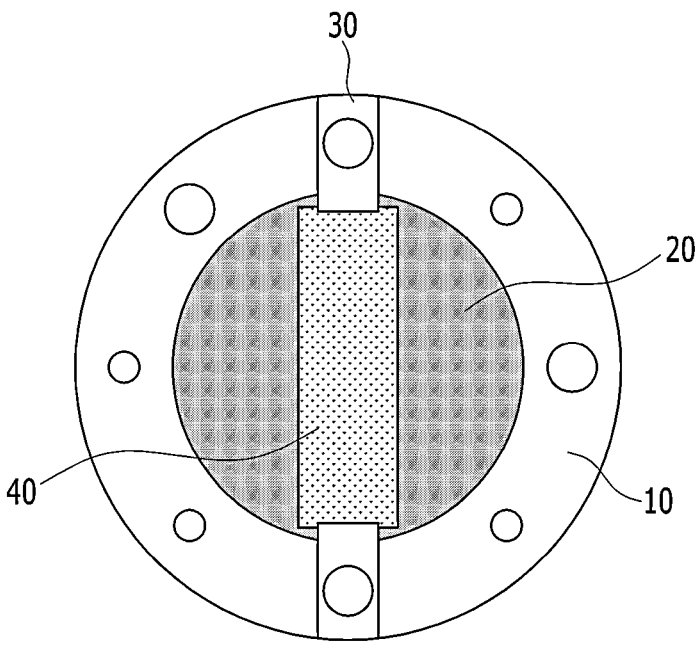
FIG. 4 is a top plan view illustrating an SEM-EDS holder device for a thin filter-type sample according to a second embodiment of the present disclosure.
Figure 5:
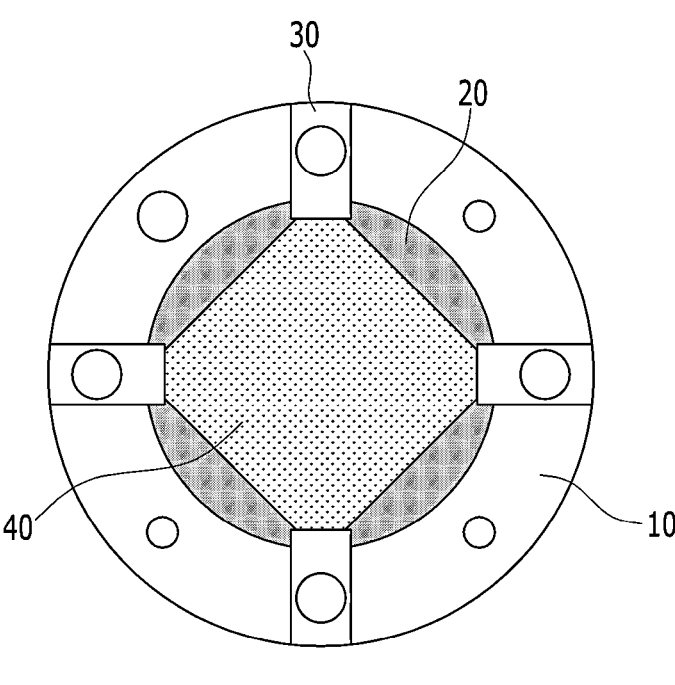
FIG. 5 is a top plan view illustrating an SEM-EDS holder device for a thin filter-type sample according to a third embodiment of the present disclosure.

Hereinafter, embodiments will be described in detail with reference to the accompanying drawings. However, the embodiments may be variously changed, and the protection scope of the patent application is not restricted or limited by the embodiments. It should be understood that all alterations, equivalents, and alternatives of the embodiments are included in the protection scope.

The terminologies used in the embodiments are used for the purpose of describing the embodiments only, and it should not be interpreted that the terminologies are intended to limit the embodiments. Singular expressions include plural expressions unless clearly described as different meanings in the context. In the present specification, the terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms used herein, including technical or scientific terms, have the same meaning as commonly understood by those skilled in the art to which the embodiments pertain. The terms such as those defined in a commonly used dictionary should be interpreted as having meanings consistent with meanings in the context of related technologies and should not be interpreted as ideal or excessively formal meanings unless explicitly defined in the present application.

In addition, in the description of the exemplary embodiments with reference to the accompanying drawings, the same constituent elements will be designated by the same reference numerals regardless of reference numerals, and a duplicated description thereof will be omitted. In the description of the embodiment, the specific descriptions of publicly known related technologies will be omitted when it is determined that the specific descriptions may unnecessarily obscure the subject matter of the embodiment.

In addition, the terms first, second, A, B, (a), and (b) may be used to describe constituent elements of the embodiment. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Hereinafter, an SEM-EDS holder device for a thin filter-type sample will be described with reference to FIGS. 1 to 7.

With reference to FIGS. 1 to 5, an SEM-EDS holder device 100 for a thin filter-type sample includes a cylindrical holder main body part 10, a disc part 20 provided at one side of the holder main body part 10 and configured such that a sample 40 is seated on the disc part 20, and a sample holder part 30 having one side coupled to be fixedly supported on the holder main body part 10, and the other side configured to fix the sample 40 seated on the disc.

The holder main body part 10 includes a body 11 having a seating groove 13 in which the disc part 20 is seated, and a central shaft 12 formed on a lower portion of the body 11. The body 11 may have two stepped portions, and a plurality of fastening holes 14 may be formed in a diameter direction based on a center point of the body 11. In this case, the holder main body part 10 is made of a non-magnetic element having electrical conductivity. Particularly, the holder main body part 10 may be made of aluminum that is easy to process.

More specifically, the body 11 has a cylindrical shape, the seating groove 13 having a circular shape is formed in an upper portion of the body 11, and a flange (not illustrated) is formed on the lower portion of the body 11. The plurality of fastening holes 14 may be formed in the flange (not illustrated).

The plurality of fastening holes 14 may be radially disposed at equal intervals at a predetermined angle of 45 degrees based on the center point and fastened to the sample holder part 30.

For example, the method of fixing the sample 40 may be variously selected from two-point coupling, three-point coupling, and four-point coupling. Therefore, the number of fastening holes to be used and the interval between the fastening holes may vary depending on the method of fixing the sample 40.

Meanwhile, the disc part 20 may have a circular plate shape and be inserted into the seating groove 13 formed in the upper portion of the body 11 of the holder main body part 10. The sample 40 and the sample holder part 30 may be mounted while being in contact with an upper plate of the disc part 20. In this case, a depth of the seating groove 13 is 0.5 mm. When the disc part 20 is inserted into the seating groove 13, the disc part 20 covers the holder main body part 10, and the holder main body part 10 is positioned below the disc part 20, such that the holder main body part 10 may be positioned so as not to cause interference so that the component of the holder main body part 10 is undetectable as much as possible at the time of detecting the chemical components of the sample.

Figure 7:
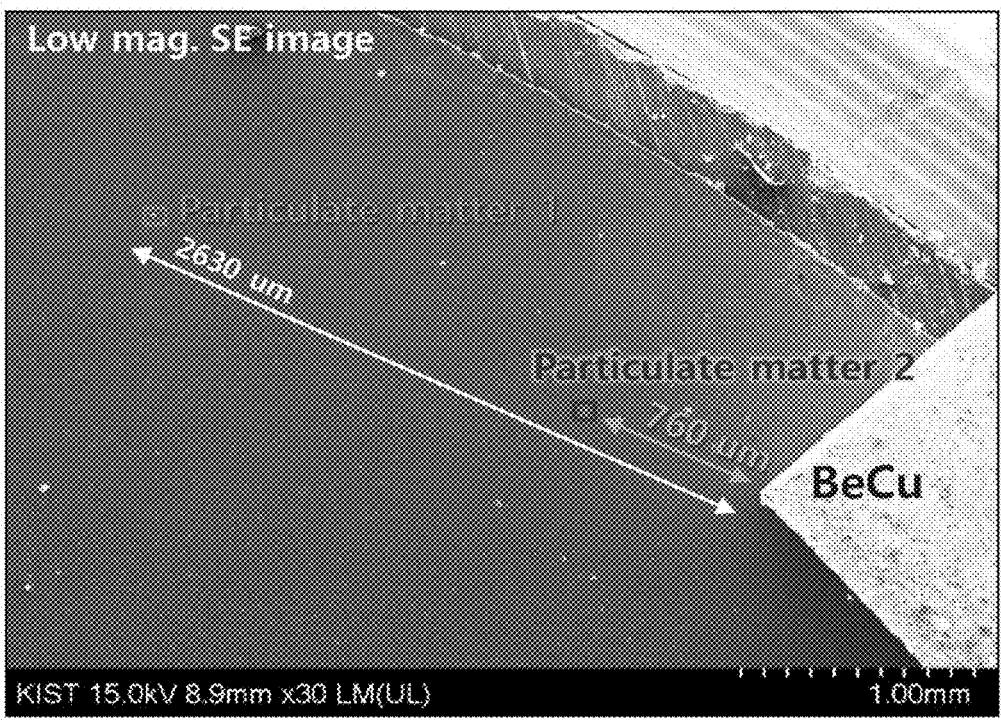
FIG. 7 is an image and spectrum graph illustrating a result of analyzing an inorganic compound of the SEM-EDS analysis holder device according to the embodiment of the present disclosure.
Figure 7:
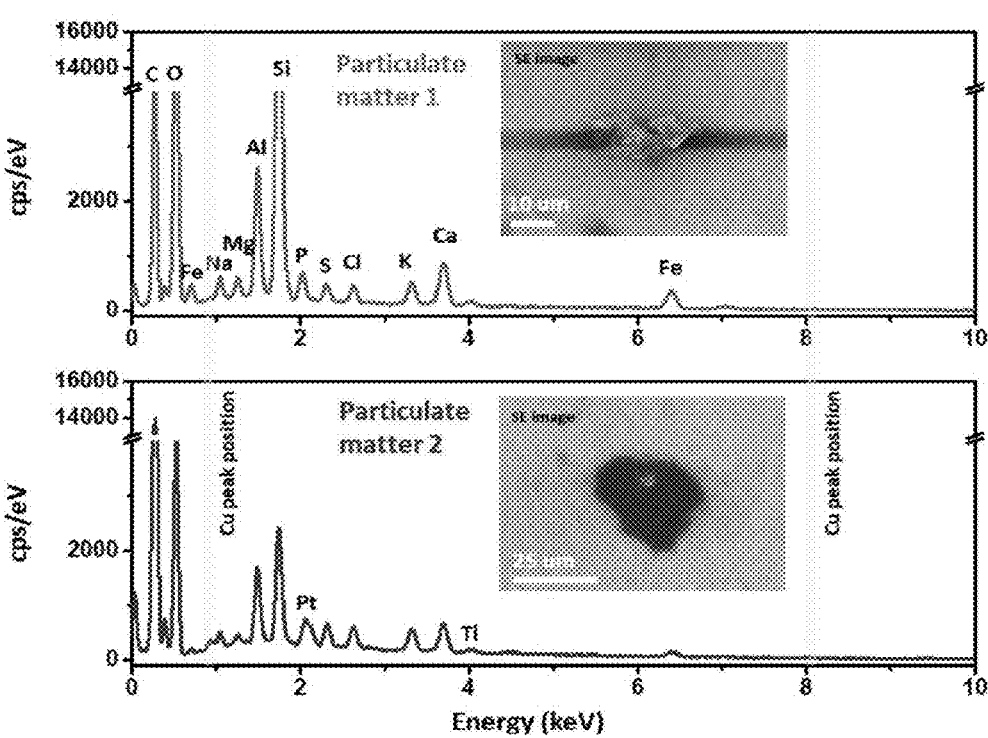

In addition, the seating groove 13 may have a diameter smaller than a diameter of the upper portion of the holder main body part 10, such that a stepped portion is formed between the seating groove 13 and the holder main body part 10. The reason why the stepped portion is formed between the holder main body part 10 and the seating groove 13 for the disc is to prevent the detection of the component of the holder main body part 10 as much as possible because an EDS detector is disposed above the sample 40, inclined at about 16 to 17 degrees, and configured to detect characteristic X-rays, as illustrated in FIG. 7. That is, because the holder main body part 10 is designed to be disposed at a lower side, the interference caused by the interaction between the electron beams and the holder main body part 10 decreases. The reason why the disc part 20, onto which the specimen 40 is loaded, is disposed at an upper side and the holder main body part 10 is positioned at the lower side as much as possible is to prevent the component of the holder main body part 10 from being detected during the EDS detection.

In this case, the disc part 20 may be made of a non-magnetic element having electrical conductivity, particularly beryllium. However, there may be various types of disc parts, such as graphene-coated carbon planchets, depending on the sample and various conditions.

In addition, a carbon substrate, a graphene-coated carbon substrate, and the like may be used as the disc part 20 in accordance with the sample 40, i.e., an analysis target. A diameter of the disc part 20 may be 25 mm.

The sample holder part 30 has a"¬" shape and includes a coupling portion (not illustrated) coupled to the holder main body part 10, and a fixing portion (not illustrated) positioned at an upper side of the coupling portion and fixed to the sample 40 while being in contact with the sample 40. The sample holder part 30 may fix and support the sample 40 by any one of two-point supporting, three-point supporting, and four-point supporting. In this case, the sample holder part 30 may be made of a non-magnetic element having electrical conductivity, particularly beryllium or a beryllium copper alloy.

According to the first embodiment, in case that the sample holder part 30 adopts a three-point supporting method, the sample holder part 30 includes a first support part 31 configured to fix and support a first lateral surface of the sample 40, a second support part 32 configured to fix and support a second lateral surface of the sample 40 and provided at the same distance from the center point of the disc part 20 as the first support part 31, and a third support part 33 configured to fix and support a third lateral surface of the sample 40 and provided at the same distance as the first support part 31.

In this case, the fixing portion of the third support part 33 may be longer in length than the fixing portion of the first support part 31 or the second support part 32. In addition, the fixing portion of the third support part 33 may be positioned to the central portion of the disc part 20 and fix the sample 40.

More specifically, the first support part 31, the second support part 32, and the third support part 33 of the sample holder part 30 may fix and support three ends of the sample 40 having a fan shape, respectively. Therefore, the sample 40 may be seated on the upper portion of the disc part 20 and fixedly supported between the first to third support parts 31, 32, and 33 of the sample holder part 30, thereby preventing an inadvertent movement of the sample 40. In this case, the sample may be a thin-film type filter or foil, and a maximum diameter thereof may be 25 mm or less.

According to a second embodiment, in case that the sample holder part 30 adopts a two-point supporting method, the two-point supporting method is identical in configuration to the above-mentioned three-point supporting method. The two-point supporting method may include the first support part and the second support part and fix and support two opposite ends of the sample 40.

According to a third embodiment, in case that the sample holder part 30 adopts a four-point supporting method, the four-point supporting method is identical in configuration to the above-mentioned three-point supporting method. The four-point supporting method may include a first support part, a second support part, a third support part, and a fourth support part and fix and support four edges of the sample 40.

Figure 6:
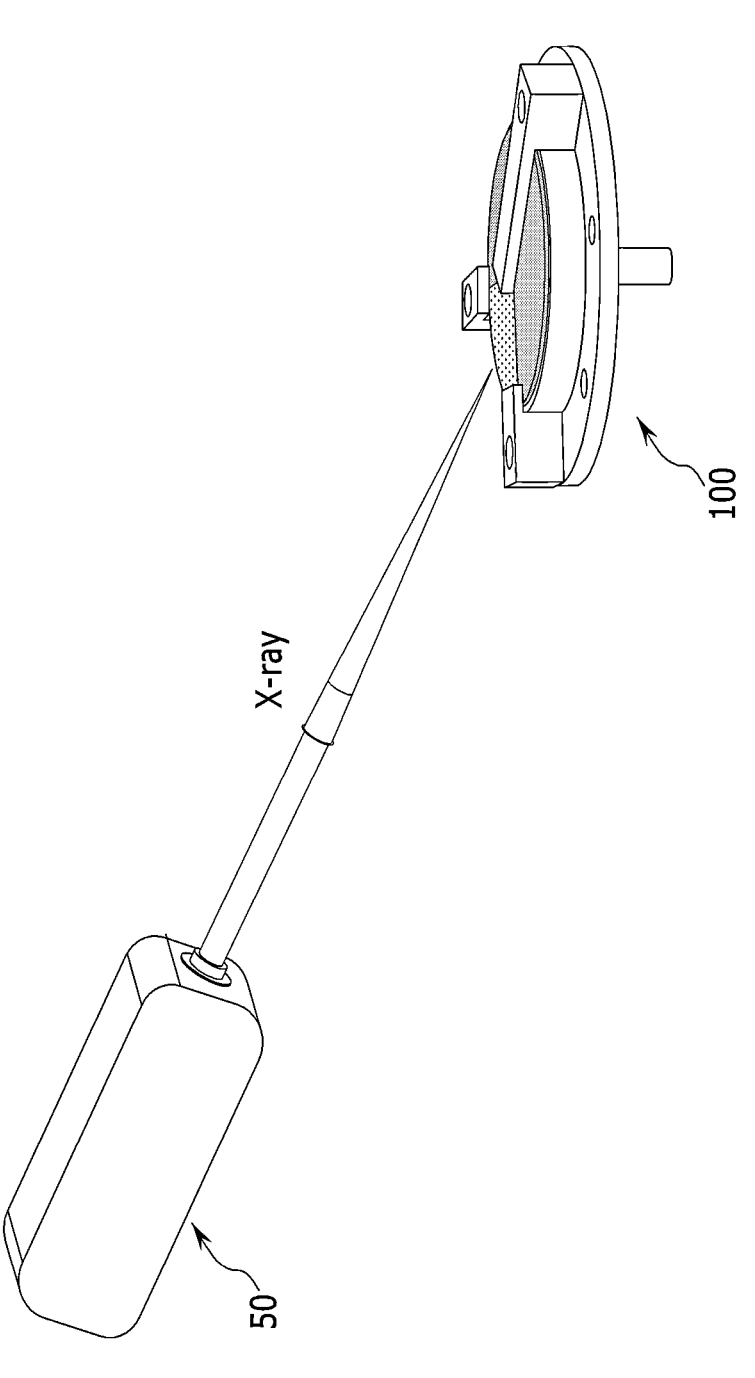
FIG. 6 is a perspective view illustrating a state in which a detector is added to the SEM-EDS analysis holder device according to the embodiment of the present disclosure.

Meanwhile, FIG. 6 is a perspective view illustrating a state in which a detector is added to the SEM-EDS analysis holder device according to the embodiments of the present disclosure.

With reference to FIG. 6, the holding device may further include a detector 50 disposed to be spaced apart from the sample 40 and configured to detect X-rays emitted from the sample 40. The detector 50 may be disposed at a position at which the X-rays emitted from the sample 40 do not interfere with the sample holder part 30.

More specifically, the detector 50 is spaced apart from the sample 40 at a predetermined distance and detects characteristic X-rays emitted from the sample 40. The detector 50 may analyze the component of the sample 40.

In addition, a direction of the detector 50 may be disposed so as not to interfere with the sample holder part 30, such that the direction of the detector 50 may be adjusted, as necessary, to prevent the interference at the time of loading the sample holder part.

Meanwhile, FIG. 7 is an image and spectrum graph illustrating a result of analyzing an inorganic compound of the SEM-EDS holder device for a thin filter-type sample according to the embodiments of the present disclosure.

FIG. 7 illustrates an image and spectrum graph of the SEM-EDS analysis holder device that show a result of analyzing the sample. For example, the image and spectrum graph show the result of analyzing the inorganic compound existing in the sample fixed by the SEM-EDS analysis holder device.

Therefore, in the present disclosure, a Cu peak is observed from the EDS detector 50 at a point of Particulate matter 2 in the vicinity of the sample holder part 30 having BeCu component, but the Cu peak is as quantitatively small as 0.27 at. %.

That is, when the detector 50 measures the sample 40, almost no chemical component of the sample holder part 30 is detected, such that the component of the sample holder part 30 may not be detected.

While the embodiments have been described above with reference to the limited drawings, the embodiments may be variously and technologically modified and altered from the disclosure by those skilled in the art to which the embodiments pertain. For example, appropriate results may be achieved even though the described technologies are performed in different orders from the described method, the described constituent elements such as the systems, the structures, the apparatuses, and the circuits are coupled or combined in different manners from the described method, and/or the constituent elements are substituted with or replaced by other constituent elements or equivalents.

Accordingly, other implements, other exemplary embodiments, and equivalents to the appended claims are also included in the scope of the appended claims.

DESCRIPTION OF SYMBOLS

10: Holder main body part
20: Disc part
30: Sample holder part
40: Sample
50: Detector

What is claimed is:

1. An SEM-EDS holder device for a thin filter type sample, the SEM-EDS holder device comprising:
   a cylindrical holder main body part;
   a disc part provided at one side of the holder main body part and configured such that a sample is seated on the disc part; and
   a sample holder part having one side fixedly supported by being coupled to the holder main body part, and the other side configured to fix the sample seated on the disc,
   wherein the holder main body part comprises a body having a seating groove in which the disc part is seated.

2. The SEM-EDS holder device of claim 1,
   wherein
   the holder main body part further comprises
   a central shaft formed on a lower portion of the body, and
   wherein the body has two stepped portions and has a plurality of fastening holes formed in a diameter direction based on a center point thereof.

3. The SEM-EDS holder device of claim 2, wherein:
   the plurality of fastening holes is radially disposed at equal intervals at 45 degrees.

4. The SEM-EDS holder device of claim 1, wherein:
   the disc part has a circular plate shape and a diameter smaller than a diameter of an upper portion of the holder main body part and forms a stepped portion together with the holder main body part.

5. The SEM-EDS holder device of claim 1, wherein:
   the sample holder part has a "¬" shape and includes a coupling portion coupled to the holder main body part, and a fixing portion positioned at an upper side of the coupling portion and fixed while being in contact with the sample.

6. The SEM-EDS holder device of claim 1, wherein:
   the sample holder part fixes and supports the sample by any one of two-point supporting, three-point supporting, and four-point supporting.

7. The SEM-EDS holder device of claim 1, wherein:
   the holder main body part, the disc part, or the sample holder part is made of a non-magnetic element having electrical conductivity.

8. The SEM-EDS holder device of claim 1, wherein:
   a material of the holder main body part is aluminum.

9. The SEM-EDS holder device of claim 1, wherein:
   a material of the disc part is beryllium.

10. The SEM-EDS holder device of claim 1, wherein:
   a material of the sample holder part is a beryllium copper alloy.

11. The SEM-EDS holder device of claim 1, further comprising:
   a detector spaced apart from the sample and configured to detect characteristic X-rays emitted from the sample, wherein the detector is disposed at a position at which the characteristic X-rays emitted from the sample do not interfere with the sample holder part.

* * * * *